US008868728B2

(12) United States Patent
Margolies et al.

(10) Patent No.: US 8,868,728 B2
(45) Date of Patent: Oct. 21, 2014

(54) SYSTEMS AND METHODS FOR DETECTING AND INVESTIGATING INSIDER FRAUD

(75) Inventors: Jeffrey M. Margolies, New York, NY (US); Keith Gregory Lippiatt, Westlake Village, CA (US); Joseph Eric Krull, San Antonio, TX (US)

(73) Assignee: Accenture Global Services Limited, Dublin (IE)

( * ) Notice: Subject to any disclaimer, the term of this patent is extended or adjusted under 35 U.S.C. 154(b) by 435 days.

(21) Appl. No.: 12/950,251

(22) Filed: Nov. 19, 2010

(65) Prior Publication Data

US 2011/0225650 A1    Sep. 15, 2011

Related U.S. Application Data

(60) Provisional application No. 61/313,094, filed on Mar. 11, 2010.

(51) Int. Cl.
| | |
|---|---|
| *G06F 15/173* | (2006.01) |
| *G06F 11/00* | (2006.01) |
| *G08B 23/00* | (2006.01) |
| *G06F 21/55* | (2013.01) |
| *G06Q 50/22* | (2012.01) |
| *G06Q 10/06* | (2012.01) |

(52) U.S. Cl.
CPC .............. *G06F 21/554* (2013.01); *G06Q 50/22* (2013.01); *G06Q 10/06* (2013.01)
USPC .................. 709/224; 709/225; 726/1; 726/23; 726/25

(58) Field of Classification Search
USPC ...................... 726/22, 1, 23, 25; 709/223–225
See application file for complete search history.

(56) References Cited

U.S. PATENT DOCUMENTS

| | | | | |
|---|---|---|---|---|
| 6,158,010 A * | 12/2000 | Moriconi et al. | .................. | 726/1 |
| 6,789,202 B1* | 9/2004 | Ko et al. | .......................... | 726/23 |
| 7,673,147 B2* | 3/2010 | Moghe et al. | ................. | 713/182 |
| 7,877,806 B2* | 1/2011 | Repasi et al. | .................... | 726/23 |
| 7,934,253 B2* | 4/2011 | Overcash et al. | ............... | 726/22 |
| 8,176,527 B1* | 5/2012 | Njemanze et al. | ................ | 726/2 |
| 2001/0049793 A1* | 12/2001 | Sugimoto | ..................... | 713/200 |
| 2002/0178383 A1* | 11/2002 | Hrabik et al. | ................. | 713/201 |
| 2004/0010709 A1* | 1/2004 | Baudoin et al. | ............... | 713/201 |
| 2004/0193907 A1* | 9/2004 | Patanella | ...................... | 713/200 |
| 2004/0193912 A1* | 9/2004 | Li et al. | ......................... | 713/200 |

(Continued)

OTHER PUBLICATIONS

Neural Technologies, "Our Technology," 2010, 2 pages, accessed at http://www.neuralt.com/our_technology.html.

(Continued)

*Primary Examiner* — Madhu Woolcock
(74) *Attorney, Agent, or Firm* — Finnegan, Henderson, Farabow, Garrett & Dunner, L.L.P.

(57) ABSTRACT

Systems, methods, and apparatus, including computer programs encoded on computer storage media, for detecting insider fraud. One method includes identifying one or more insider threat detection rules for an enterprise and obtaining behavioral data for an enterprise insider from multiple behavioral data sources. The enterprise is associated with a plurality of enterprise insiders, and the behavioral data describes at least one action of the first enterprise insider. The method further includes determining a threat score for the first enterprise insider based on the behavioral data for the first enterprise insider and one or more of the insider threat detection rules and initiating, when the threat score satisfies a threat threshold, one or more protective actions.

15 Claims, 6 Drawing Sheets

(56) References Cited

U.S. PATENT DOCUMENTS

| | | | |
|---|---|---|---|
| 2005/0021360 A1* | 1/2005 | Miller et al. | 705/1 |
| 2005/0044406 A1* | 2/2005 | Stute | 713/201 |
| 2005/0203881 A1 | 9/2005 | Sakamoto et al. | |
| 2006/0026009 A1* | 2/2006 | Luhr | 705/1 |
| 2006/0053490 A1* | 3/2006 | Herz et al. | 726/23 |
| 2007/0124246 A1* | 5/2007 | Lawyer et al. | 705/50 |
| 2007/0220604 A1* | 9/2007 | Long | 726/22 |
| 2008/0015878 A1* | 1/2008 | Feng et al. | 705/1 |
| 2008/0022407 A1* | 1/2008 | Repasi et al. | 726/25 |
| 2008/0104039 A1* | 5/2008 | Lowson | 707/3 |
| 2008/0178279 A1* | 7/2008 | Namburu et al. | 726/13 |
| 2008/0242221 A1* | 10/2008 | Shapiro et al. | 455/3.06 |
| 2008/0244694 A1* | 10/2008 | Neystadt et al. | 726/1 |
| 2008/0244742 A1* | 10/2008 | Neystadt et al. | 726/23 |
| 2008/0244748 A1* | 10/2008 | Neystadt et al. | 726/25 |
| 2008/0271143 A1* | 10/2008 | Stephens et al. | 726/22 |
| 2010/0036779 A1* | 2/2010 | Sadeh-Koniecpol et al. | 706/11 |

OTHER PUBLICATIONS

Neural Technologies, "User Empowerment," 2010, 1 page, accessed at http://www.neuralt.com/user_empowerment.html.

Neural Technologies, "Applications," 2010, 1 page, accessed at http://www.neuralt.com/applications.html.

RSA Security Inc., "RSA Adaptive Authentication—Offering Multiple Ways to Provide Strong Two-Factor Authentication to End Users—RSA Solution Brief," 2008, pp. 1-4, accessed at http://www.rsa.com/products/consumer/sb/9697_AATF_SB_0808.pdf.

EMC Corporation, "RSA Adaptive Authentication for eCommerce—Building a Strategy for eCommerce Authentication," 2010, 2 pages, accessed at http://www.rsa.com/node.aspx?id=3070.

Raytheon Company, "Mission Assurance without Mission Deterrence," 2009-2011, 2 pages, accessed at http://www.raytheon.com/capabilities/products/cybersecurity/insiderthreat, on Mar. 16, 2011.

CyberSource, "CyberSource Risk Management Solutions," 2008, 16 pages, accessed at http://www.cybersource.com/resources/collateral/Resource_Center/service_briefs/risk_svcs_overview_datasheet.pdf.

Subex Limited, "Nikira Fraud Management System—Introduction," 2009, 2 pages, accessed at http://www.subexworld.com/pdf/nikira.pdf.

Hewlett-Packard Development Company, L.P., "HP Revenue Intelligence Solutions—HP RealTime BSS—Solution Brief," Nov. 2009, 4 pages, accessed at http://h20195.www2.hp.com/V2/GetPDF.aspx/4AA1-5299ENW.pdf.

ErCon Danismanlik, "Entrust—Transaction Guard," 2009, 3 pages, accessed at http://www.ercon.com.tr/entrust-transaction-guard.html.

Digital Envoy, "Our Solutions," 2010, 2 pages, accessed at http://www.digital-resolve.net/solutions/our_solutions.html.

Digital Envoy, "Transaction Monitoring," 2010, 1 page, accessed at http://www.digital-resolve.net/solutions/transaction_monitoring.html.

Digital Envoy, "Login Authentication," 2010, 2 pages, accessed at http://www.digital-resolve.net/solutions/login_authentication.html.

Digital Envoy, "Identity Verification," 2010, 1 page, accessed at http://www.digital-resolve.net/solutions/identity_verification.html.

Digital Envoy, "Research & Reporting," 2010, 2 pages, accessed at http://www.digital-resolve.net/solutions/research_reporting.html.

Memento, Inc., "Employee Fraud," 2010, 1 page, accessed at http://www.mementosecurity.com/solutions/employee_fraud.php.

Memento, Inc., "Detect Employee Fraud With Memento Security," 2010, 6 pages, accessed at http://www.mementosecurity.com/docs/Memento_Employee_Fraud_print.pdf.

APIS, "Advanced Data Management—APIS Modules," 2 pages, accessed at http://enabl-u.com/ADM-Modules.html.

APIS, "Advanced Data Management—APIS is the Industry Leading Incident, Investigation, Case and Claims Management System," 1 page, accessed at http://enabl-u.com/ADM-2.html.

IBM, "Detecting Insider Threat & Collusion With IBM InfoSphere Entity Analytic Solutions," 2009, 4 pages, accessed at ftp://ftp.software.ibm.com/software/data/sw-library/ii/brief/EntityAnalyticsforInsiderThreat.pdf.

Actimize, "Employee Fraud," 2009, 2 pages, accessed at http://www.actimize.com/index.aspx?page=solutionsfraudinsider.

FIS, "FIS Actimize Risk Case Manager—Enterprise Edition," 2010, 2 pages, accessed at http://www.fisglobal.com/cmspub/groups/public/documents/document/mvp0_016329.pdf.

Detica, "Insider Fraud: Another Hidden Iceberg?—A Detica White Paper," 8 pages, accessed at http://www.detica.com/images/pdfs/Insider_Fraud_White_Paper.pdt.

Intellinx, "Preventing Insider Fraud at Healthcare Insurers & Providers," 2 pages, accessed at http://www.intellinx-sw.com/cms/upload/HealthCare%20Datasheet.pdf.

SAS.com Magazine, "Fraud Detection—In Real Time—Right Now," $4^{th}$ Quarter Issue, 2005, 2 pages, accessed at http://www.sas.com/news/sascom/2005q4/feature_hsbc.html.

SAS Institute Inc., "Fraud Detection and Prevention with the SAS Fraud Framework for Insurance," 2004, 3 pages, accessed at http://searchforum.org.cn/dataflowgroup/dsms_home_en/Reading/2004Paper/SpamPaper/TrafficAndDataStream/A%20Comprehensive%20Survey%20of%20Data%20Mining-based%20Fraud%20Detection%20Research.pdf.

Department of Computer Science, Columbia University, Ben Salem, Malek et al., "A Survey of Insider Attack Detection Research," pp. 1-20, accessed at http://www.sas.com/industry/ins/fraud.

Phua, Clifton, et al., "A Comprehensive Survey of Data Mining-Based Fraud Detection Research," School of Business Systems, Faculty of Information Technology, Monash University and Baycorp Advantage, Sep. 2, 2005, pp. 1-14, accessed at http://sneakers.cs.columbia.edu/ids/publications/Survey.pdf.

* cited by examiner

SYSTEMS AND METHODS FOR DETECTING AND INVESTIGATING INSIDER FRAUD

PRIORITY

This application claims the benefit of priority of U.S. Provisional Application No. 61/313,094, filed Mar. 11, 2010, which is incorporated by reference herein in its entirety for any purpose.

TECHNICAL FIELD

The present disclosure relates generally to methods and apparatuses for detecting and investigating fraud and, more particularly, to methods and apparatuses for detecting and investigating insider fraud.

BACKGROUND

Insider fraud occurs when an enterprise insider, e.g., an employee of a given enterprise or company, abuses his or her access to enterprise resources to take actions that harm the enterprise, enrich the enterprise insider, or both. Enterprise insiders often are "trusted" users who need access to sensitive information and sensitive company resources in order to perform their jobs. Insider fraud can be either intentional or unintentional; some insiders are maliciously trying to commit fraud, while others simply do not understand security rules or make mistakes. Examples of insider fraud include stealing trade secrets, embezzling money, stealing customer identities, disclosing customer information, and engaging in risky trading in the name of the enterprise.

Enterprises face significant risk from the intentional and unintentional actions of insiders. Incidents caused by insiders can have a devastating impact on an enterprise. However, most security solutions focus primarily on external threats; not on threats posed by enterprise insiders. While some technologies are designed to detect and combat internal fraud, these technologies generally provide a patchwork of features without fundamentally managing risk. For example, data loss prevention (DLP) tools attempt to stop external leakage of specific sensitive data. These DLP tools analyze outgoing data to identify specific patterns corresponding to, for example, social security numbers or credit card numbers. However, these DLP tools have a limited context for detecting and blocking complex data types and can often be defeated by simple evasive tricks. As another example, content filtering solutions block specific types of suspicious activities such as file transfers, use of personal webmail accounts, and downloading of unauthorized software. However, these filtering solutions are not comprehensive. Identity and access management (IAM) tools provide tools to allow granular control of user access to systems, but cannot easily identify malicious activity by authorized users. Password management and auditing tools can detect compromised passwords, but have few abilities beyond that limited functionality. Database activity and monitoring tools monitor user access to databases but are difficult to tune and require specialized expertise to determine what is malicious. Physical security systems can detect access violation attempts, but have limited analytical functions. Other security technologies such as encryption, USB device blocking, and security event monitoring provide protection from specific threats, but do not provide more general protection.

As another example, security information and event management (SIEM) systems can detect certain types of suspicious behavior, but have to be carefully configured to avoid false positives. Network access control systems can detect and block enterprise insiders that want to launch malware within an enterprise before the insider accesses the network, but once the user is authenticated and on the network, they have little effect. Fraud detection systems can detect some fraud but require complex integration and tuning, and often do not integrate well with traditional security systems.

The disclosed embodiments are configured to overcome these and other problems.

SUMMARY

In accordance with the present invention, as embodied and broadly described herein, a computer-implemented method for detecting and investigating insider fraud, the method comprises: identifying one or more insider threat detection rules for an enterprise, the enterprise associated with a plurality of enterprise insiders; obtaining, from a plurality of behavioral data sources, behavioral data for a first enterprise insider of the plurality of enterprise insiders, the behavioral data for the first enterprise insider describing at least an action of the first enterprise insider; determining a threat score for the first enterprise insider based on the behavioral data for the first enterprise insider and one or more of the insider threat detection rules; and initiating, when the threat score satisfies a threat threshold, one or more protective actions.

In accordance with the present invention, as embodied and broadly described herein, a system for detecting and investigating insider fraud, the system comprises: at least one memory to store data and instructions; and at least one processor configured to access the at least one memory and, when executing the instructions, to: identify one or more insider threat detection rules for an enterprise, the enterprise associated with a plurality of enterprise insiders; obtain, from a plurality of behavioral data sources, behavioral data for a first enterprise insider of the plurality of enterprise insiders, the behavioral data for the first enterprise insider describing at least an action of the first enterprise insider; determine a threat score for the first enterprise insider based on the behavioral data for the first enterprise insider and one or more of the insider threat detection rules; and initiate, when the threat score satisfies a threat threshold, one or more protective actions.

In accordance with the present invention, as embodied and broadly described herein, a computer storage medium encoded with a computer program, the computer program comprising instructions operable to cause data processing apparatus to perform operations for detecting and investigating insider fraud comprising: identifying one or more insider threat detection rules for an enterprise, the enterprise associated with a plurality of enterprise insiders; obtaining, from a plurality of behavioral data sources, behavioral data for a first enterprise insider of the plurality of enterprise insiders, the behavioral data for the first enterprise insider describing at least an action of the first enterprise insider; determining a threat score for the first enterprise insider based on the behavioral data for the first enterprise insider and one or more of the insider threat detection rules; and initiating, when the threat score satisfies a threat threshold, one or more protective actions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The accompanying drawings, which are incorporated herein and constitute a part of this specification, illustrate aspects consistent with the present invention and, together with the description, serve to explain advantages and principles of the invention. In the drawings.

DETAILED DESCRIPTION

Figure 1:
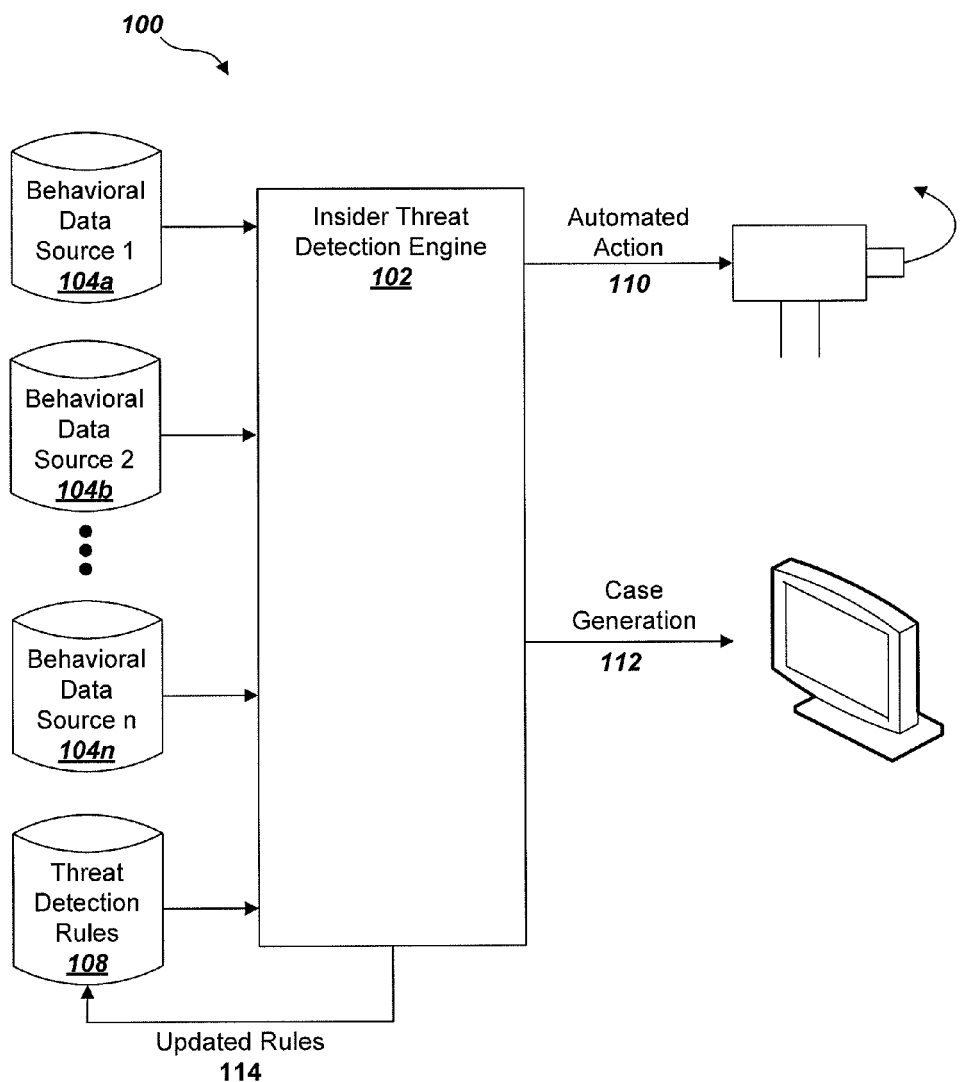
FIG. 1 is a block diagram of an insider threat detection system, consistent with certain disclosed embodiments.

The following detailed description refers to the accompanying drawings. Wherever possible, the same reference numbers are used in the drawings and the following description to refer to the same or similar parts. While several exemplary embodiments and features are described herein, modifications, adaptations and other implementations are possible, without departing from the spirit and scope of the disclosure. For example, substitutions, additions or modifications may be made to the components illustrated in the drawings, and the exemplary methods described herein may be modified by substituting, reordering or adding steps to the disclosed methods. Accordingly, the following detailed description does not limit the disclosure. Instead, the proper scope of the disclosure is defined by the appended claims.

In general, the subject matter described in this specification can be embodied in methods that include the actions of detecting insider threats to an enterprise organization by applying customized threat detection rules to data that describes an insider's interactions using two or more different types of data sources. When the application of the rules to the data indicates that a threat level meets or exceeds a certain threshold value, automated actions may be taken to monitor or limit the ability of the insider to harm an enterprise. As such, insider threats can be identified and countered in real time, and trends, including industry-specific trends, can be identified and reported.

FIG. 1 is a block diagram of an insider threat detection system 100, which can be implemented as one or more computers. Insider threat detection system 100 may include insider threat detection engine 102, multiple behavioral data sources 104 (e.g., behavioral data source 104a, behavioral data source 104b through behavioral data source 104n), and one or more sources of threat detection rules 108.

Behavioral data sources 104 may provide raw data and/or processed data that may describe the actions of one or more enterprise insiders. Behavioral data sources 104 may be pre-existing data sources of monitoring systems already in place at the enterprise, or may be new data sources created specifically for use by insider threat detection engine 102. In certain embodiments, threat detection engine 102 can receive data from the behavioral data sources 104 in real time, e.g., as user activity is occurring, and process the data in real time.

Example behavioral data sources 104 may include, for example, sources describing desktop activities, sources describing network activities, sources describing server activities, sources describing application activities, sources describing web activities, sources describing any other interaction between the insider and one or more computing devices, sources describing personnel activities, sources of human intelligence (e.g., security violation reports, hotline tips, etc), sources of firewall activities, sources of physical activities, etc.

Data from desktop activity sources may describe, for example, activities conducted at the insider's desktop computer, such as downloading of data, uploading of data, accessing (or attempts at accessing) of websites by a user, etc. Data from network activity sources may describe, for example, attempts to log-in to shared network resources, such as, for example, network drives, etc. Data from server activity sources may describe, for example, attempts by administrators to access servers, whether the accessed servers are supposed to be controlled by the administrator, etc. Data from application activity sources may describe, for example, information related to applications enterprise insiders are using, information within the applications that are being accessed, etc. Data from the web activity sources may describe, for example, what types of internal or external websites enterprise insiders visit, etc. Data from the personnel activity sources may describe, for example, employee behavior, contractor behavior, etc. This data can be received, for example, from a human resources division of an enterprise, either through discussions with human resource personnel or by accessing data automatically made available by the human resources division, etc. Data from human intelligence sources may include, for example, security violation reports, hotline tips, etc. Data from firewall activity sources may describe, for example, network traffic to and from an enterprise insider's computer, etc. Data from physical activity sources may describe, for example, the physical movements of a user, such as, for example, data from enterprise security devices such as access cards, garage accesses, etc. that may provide information such as when and where a user badged in or signed in, etc. Other sources of behavioral data may include, for example, an archive of previously collected behavioral data from the behavioral data sources, etc.

Threat detection rules 108 may specify rules for scoring combinations of enterprise insider activities. For example, a threat detection rule could specify that, when a user logs in to a computer in a secure room without using his or her badge to gain access to the secure room, a relatively high insider threat score is to be generated. Threat detection rules 108 may include, for example, one or more of enterprise-specific rules, industry-specific rules for an industry of the enterprise, general threat detection rules, etc. Enterprise-specific rules may be rules that are particular to an enterprise. Enterprise-specific rules may include, for example, rules that are generated to enforce particular enterprise policies. Industry-specific rules may be rules that apply generally to a majority of enterprises in the same industry. Industry-specific rules may differ between industries; for example, activity that constitutes insider fraud in a hospital setting may look different from activity that constitutes insider fraud in a bank setting. General threat detection rules may be rules that are applicable across multiple industries.

Insider threat detection engine 102 may analyze the behavioral data from behavioral data sources 104 to identify behavioral data for individual users, and apply threat detection rules 108 to the behavioral data for individual users to generate threat scores for the activities of the individual users. In some implementations, threat detection engine 102 may standardize or normalize the behavioral data, for example, to put the data into a common format or a predefined range of values, before applying threat detection rules 108. Insider threat detection engine 102 may use a configurable rules engine to apply threat detection rules 108 to the behavioral data to generate the threat scores. When multiple rules are applicable to user activities, the rules engine may generate an aggregate threat score from the individual scores for the applicable rules.

Insider threat detection engine 102 may compare the resulting threat detection score for the user's actions to a threat threshold. In some implementations, the same threat detection threshold is used for all enterprise insiders. In other implementations, different threat detection thresholds may be used for different enterprise insiders. For example, the threat detection thresholds can change according to a level of access associated with the enterprise insider. In some embodiments, the more access to sensitive information that an enterprise insider has, the higher, or the lower, the threat detection threshold can be.

If the threat detection score satisfies, e.g., meets and/or exceeds, the threat detection threshold, insider threat detection engine 102 may initiate one or more actions. These actions may include automated actions 110 and case generation 112. Automated actions 110 may be actions that insider threat detection system 100 takes automatically to increase monitoring of the enterprise insider, to reduce the risk that any insider fraud will continue, etc. For example, insider threat detection system 100 may initiate direct monitoring of the enterprise insider by video camera, microphone, etc. Insider threat detection system 100 may also reduce the access of the enterprise insider to sensitive enterprise resources, for example, by blocking the enterprise insider from all systems entirely, by blocking the enterprise insider from all selected sub-systems, etc. Insider threat detection system 100 may also limit the ability of the enterprise insider to remove information from the enterprise, for example, by blocking the enterprise insider's network access, decreasing a limit on the size of email attachments that may be sent by the enterprise insider, by disabling USB ports and disk drives on any computing devices currently being used by the enterprise insider, etc. Insider threat detection system 100 may also initiate an automated investigation, for example, by re-analyzing behavioral data for past actions of the enterprise insider to determine whether there is a pattern of insider fraud behavior, etc. Insider threat detection system 100 may also automatically initiate an investigation by one or more enterprise investigators internal to the enterprise.

A generated case 112 may include relevant behavioral details, the score generated by the insider threat detection engine 102, etc. In some implementations, the generated case may automatically be provided to a human analyst. In other implementations, insider threat detection system 100 may take different actions depending on the score and/or behavior details. For example, if the score satisfies a low threshold but not a high threshold, threat detection engine 102 may open a case for the activity but not alert an analyst. Threat detection engine 102 may continue to monitor additional data relevant to the case, and rescore the case as appropriate. If the score later satisfies the high threshold, insider threat detection engine 102 may then notify a human analyst.

Once the human analyst receives the generated case, the human analyst may review the case and optionally seek additional information, for example, by contacting enterprise employees or contractors, for example, human resources staff, to determine if there is other relevant information available. The human analyst may then determine whether any further action is to be taken. In some implementations, the human analyst is external to the enterprise and may make a determination whether or not to alert security staff internal to the enterprise so that the internal security staff may take further action. In other implementations, the human analyst is part of the internal staff of the enterprise and determines what further action should be taken, e.g., interrogating the enterprise insider, blocking more of the enterprise insider's access to resources, alerting the police, or firing the enterprise insider. The case information may be maintained using a case management system. Information about the case may be presented to an analysis through a dashboard. In some implementations, the dashboard is a graphical event management dashboard.

Once the case is generated, the case may be periodically re-scored, for example, as additional information is gathered. Insider threat detection engine 102 may perform this re-scoring, for example, using a case scoring system, or the rules scoring engine that was used to originally score the data. The analyst or the insider threat detection system 100 can prioritize investigation of events according to the scores generated by the insider threat detection engine.

In some implementations, the generated case may also include an automated workflow for the analyst to follow. The automated workflow may list one or more specific steps to be taken to resolve the case such that even a novice analyst is able to resolve a situation without having to rely unduly on his or her own judgment. For example, an example automated workflow may prompt the analyst to call human resources and ask a specific list of questions. This list of questions may include, for example, whether the enterprise insider was leaving the enterprise, whether the enterprise insider had been disciplined recently, whether the enterprise insider had made any threats, etc. The automated workflow could then prompt the analyst to input the answers to those questions and, depending on the answers (or independent of those answers), suggest next steps. For example, the automated workflow could suggest that the human analyst check any previous reports generated by the system and/or past historical log data to determine if the enterprise insider has been suspected of insider fraud in the past.

The automated workflows may be generated according to one or more workflow templates stored in a workflow template library. The one or more workflow templates can be specific to the enterprise, specific to the industry of the enterprise, or more general (e.g., across industries). When an automated workflow is generated from a template, information specific to the enterprise, or to the situation, may be added to the other information available from the template. For example, if one step of the workflow is to call the enterprise insider's supervisor, the workflow could be populated with contact information for the enterprise insider's supervisor. As another example, if one step on the workflow is to review previous reports generated for the enterprise insider, the workflow could be populated with links to the reports. In some implementations, when the actions of the enterprise insider are suspected of being unlawful activity, the workflow may provide the analyst with specific cautions regarding how to handle potential evidence. The workflow may also provide the analyst with contact information for computer forensics personnel or appropriate law enforcement officials.

In some implementations, insider threat detection engine 102 may receive feedback from one or more entities, and generate updated threat detection rules 114 based on this feedback. This process is described in more detail below with reference to FIG. 3.

Figure 2:
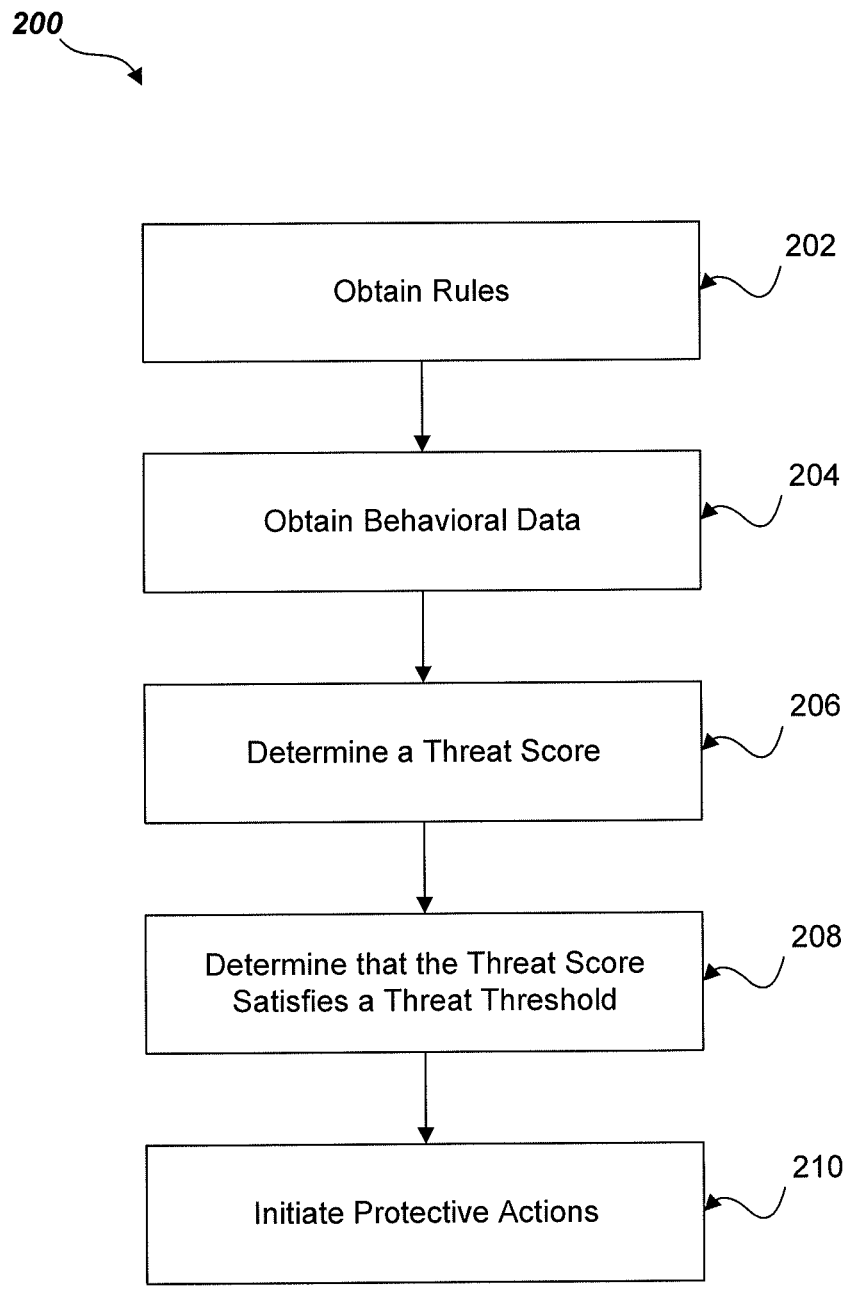
FIG. 2 is a flow chart of an example process for identifying a threat from an enterprise insider and initiating one or more protective actions in response to the identification, consistent with certain disclosed embodiments.

FIG. 2 is a flow chart of an exemplary process 200 for identifying a threat from an enterprise insider and initiating one or more protective actions in response to the identification, consistent with certain disclosed embodiments. For convenience, process 200 is described with reference to a system that is configured to perform the process 200, such as, for example, insider threat detection system 100.

As shown in FIG. 2, insider threat detection system 100 may identify one or more insider threat detection rules 108 for an enterprise (202). Insider threat detection system 100 may obtain behavioral data for an enterprise insider (204). As discussed above in connection with FIG. 1, the behavioral data may be obtained from a plurality of behavioral data sources 104. The behavioral data may describe the actions of the enterprise insider, and may also describe the actions of other enterprise insiders.

Insider threat detection system 100 may calculate or otherwise determine a threat score (206). In some embodiments, the threat score may be calculated or determined for the actions of the enterprise insider based on the behavioral data for the enterprise insider and the one or more insider threat detection rules for the enterprise.

When the behavioral data includes data for multiple enterprise insiders, the system can parse the data to identify actions for the particular enterprise insider. For example, the behavioral data can include data specifying which user took which action, and insider threat detection system 100 may use this data to determine the actions of the particular enterprise insider. When an enterprise insider has and/or uses different identifiers for different types of data, data accesses, and/or data sources, insider threat detection system 100 may reconcile the different user identifiers. For example, if one source of behavioral data identifies the enterprise insider by his or her employee identification number and another source of behavioral data identifies the same enterprise insider by his or her network login, the system can reconcile the two different identifiers as part of identifying the data for the enterprise insider. Once the system has identified the actions of the enterprise insider, the system may determine the threat score by applying the threat detection rules.

Insider threat detection system 100 may determine that the threat score satisfies a threat threshold (208), and initiate one or more protective actions in response to the determination that the threat score satisfies the threshold (210). In some implementations, the threat score represents a likelihood that the actions of the enterprise insider represent insider fraud. The protective actions may include, for example, one or more of monitoring the enterprise insider, automatically investigating the potential insider fraud, limiting access of the enterprise insider to one or more resources, or limiting the ability of the enterprise insider to remove data from the enterprise, as described above with reference to FIG. 1. In some embodiments, the protective actions may include generating a case and optionally sending the case to an analyst for review, as described above in connection with FIG. 1.

In some implementations, when the threat score satisfies the threshold, the system also generates a report describing the details of the incident, and optionally the protective actions that were taken. The report can be generated according to a format specified by the enterprise.

In some implementations, insider threat detection system 100 may maintain data describing past enterprise insider activity that led the system to take protective actions, and the result of the protective actions. Insider threat detection system 100 may analyze this data to, for example, evaluate the effectiveness of one or more of the enterprise's security policies, the enterprise's security education, the enterprise's training programs, and the like. For example, insider threat detection system 100 may determine whether, and how often, security policies are being followed or whether the enterprise's training programs have effectively relayed what is and what is not allowed. As another example, if an enterprise has a lot of suspected internal fraud activity, but most suspected enterprise insiders are cleared as having acted out of ignorance of security policies, insider threat detection system 100 may determine that the enterprise's training programs are not effective. The results of the analysis by insider threat detection system 100 may be used to determine whether the organization's security policies are enforceable and what, if any, changes should be made to employee education programs.

While the above discussion describes looking at the actions of an individual enterprise insider, in some implementations, insider threat detection system 100 may analyze the actions of multiple enterprise insiders, and generate a score for their combined actions. For example, the system can identify multiple enterprise insiders whose behavior seems to be related, in regard to time of occurrence, physical location, resources used, etc. These multiple enterprise insiders can then be considered as a single enterprise insider, and the process may operate as discussed above.

Figure 3:
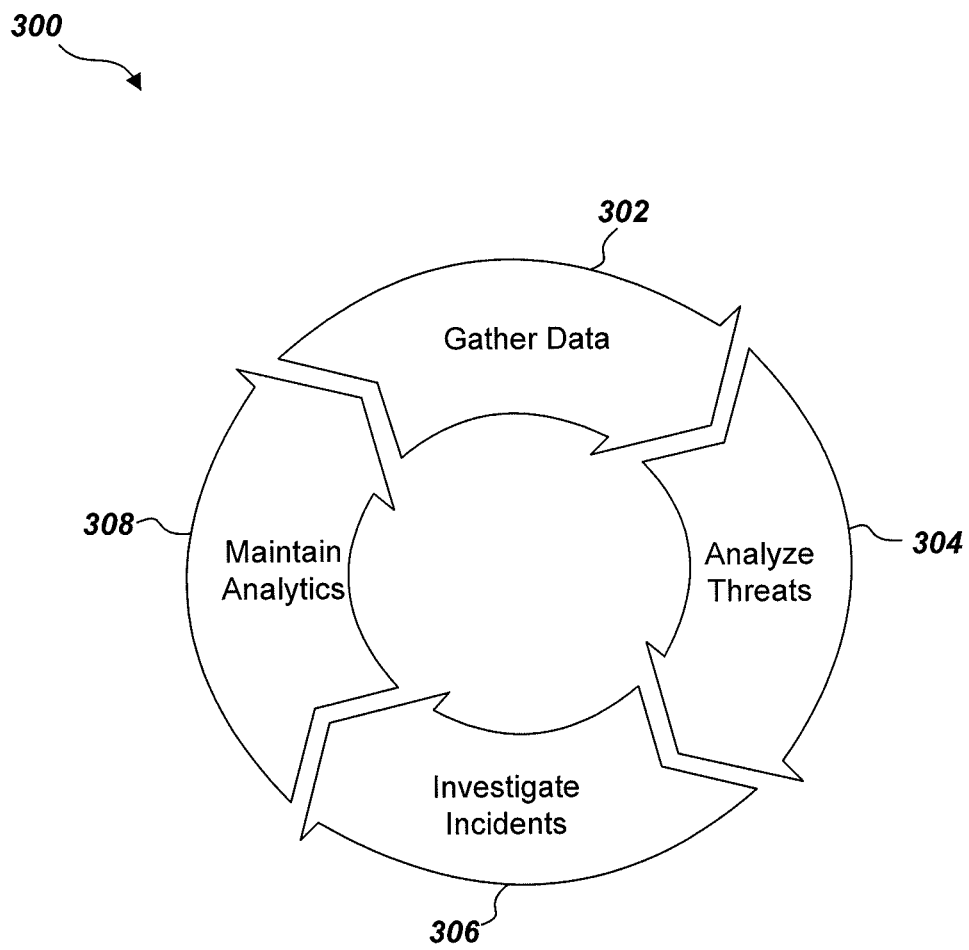
FIG. 3 illustrates an example process for identifying potential insider threats and keeping threat detection rules up to date, consistent with certain disclosed embodiments.

FIG. 3 illustrates an example process 300 for identifying potential insider threats and keeping threat detection rules up to date, consistent with certain disclosed embodiments. For convenience, the process 300 is described with reference to a system that performs the process 300, such as, for example, insider threat detection system 100.

As shown in FIG. 3, insider threat detection system 100 may gather data (302). In some embodiments, insider threat detection system 100 may gather data from behavioral data sources 104, described above with reference to FIG. 1. Insider threat detection system 100 may analyze potential threats (304), for example, by applying threat detection rules to the data. Insider threat detection system 100 may investigate incidents (306), for example, by taking automated actions or having a human analyst investigate the incidents, as described above with reference to FIG. 1. Insider threat detection system 100 may maintain analytics (308). In some embodiments, insider threat detection system 100 may maintain analytics by updating one or more threat detection rules. In some implementations, insider threat detection system 100 may receive feedback from the enterprise, and update the one or more insider threat detection rules in response to the feedback. Insider threat detection system 100 may use an analytics engine with one or more analytics rules to process the feedback and determine what updates to the insider threat detection rules are needed.

Different types of feedback may be received. In some implementations, the feedback may indicate how well the system is identifying insider threats. For example, the feedback may indicate how often false positives are flagged by the system, and optionally identify the rules that were applied to generate the false positives. As another example, the feedback can describe false negatives, i.e., situations where insider fraud was taking place but the system failed to recognize the activity as fraudulent.

In some implementations, the feedback may specify one or more particular enterprise security policies, and may be used to generate, or update, particular enterprise-specific rules. For example, the feedback could specify that an enterprise has adopted a policy where all employees are required to use a badge to gain access to one or more building locations (also referred to as "badge in" or "badging in"), and following closely behind another employee as they are badging in without using one's own badge to gain entry (also referred to as "tailgating") is strictly prohibited. Thus, in response to this feedback, insider threat detection system 100 may generate an enterprise-specific rule that causes insider threat detection system 100 to identify a potential threat whenever an employee logged into a computer physically located in a particular location without first badging into that particular location. If such a rule already existed, insider threat detection system 100 may increase the score associated with a violation of the rule.

In some implementations, the feedback may include feedback from multiple enterprises. In some embodiments, the feedback can be sanitized to remove enterprise-specific details, and then used to update either general rules, industry-specific rules, entity-specific rules, etc. For example, if a number of enterprises have all seen an increase in a particular type of fraudulent activity, insider threat detection system 100 may modify scoring rules to score that activity more highly. In some implementations, other types of feedback may be used to update the rules. For example, rules can be updated and refined based on one or more of reports of new types of technical attacks, newly discovered vulnerabilities in enterprise security systems, anecdotal information related to non-technical attempts to commit fraudulent activities, such as, for example, social engineering, masquerading as another employee, incidents of sharing user IDs and passwords within an enterprise, etc.

Figure 4:
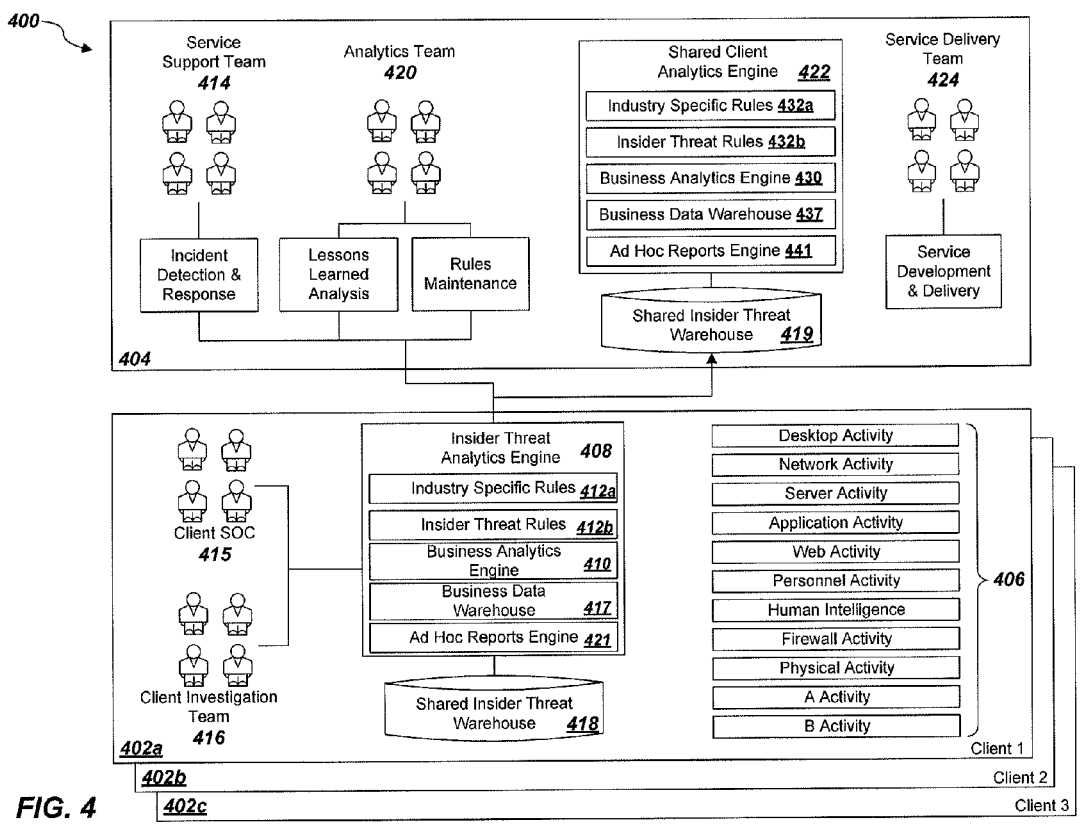
FIG. 4 is an example of a distributed threat detection system, consistent with certain disclosed embodiments.

FIG. 4 is an example of a distributed threat detection system 400, consistent with certain disclosed embodiments. Distributed threat detection system 400 may be configured to perform the processes described above. Distributed threat detection system 400 may include client sub-systems 402 for each of one or more enterprises, e.g., client sub-system 402a for client 1, client sub-system 402b for client 2, and client sub-system 402c for client 3, and server sub-system 404.

In the distributed threat detection system 400, initial analysis may be performed on the client side, i.e., at one or more client sub-systems 402. In some embodiments, analysts on the server side may review potential incidents and send incidents that need further investigation back to investigators on the client side.

As illustrated by client sub-system 402a, a client sub-system 402 may collect data 406 from various behavioral data sources, such as, for example, data sources 104 as described above with reference to FIG. 1. As shown in client sub-system 402a, "A Activity" and "B Activity" are exemplary sources of client systems, such as, for example, purpose-built systems, proprietary systems, etc. Data 406 may be provided to insider threat analytics engine 408. Insider threat analytics engine 408 may include one or more rules 412, e.g., industry-specific rules 412a, insider threat rules 412b, etc., business analytics engine 410, business data warehouse 417, and ad hoc reports engine 421.

In some embodiments, insider threat analytics engine 408 may use business analytics engine 410 to apply one or more rules 412 to data 406. Business analytics engine 410 may, in turn, determine a score for the activities of a user, and when the score exceeds a threshold, generate a case and send the case to the server sub-system 404. Insider threat analytics engine 408 may also use business analytics engine 410 to analyze business data stored in business data warehouse 417. Insider threats analytics engine 408 may use ad hoc reports engine 421 to generate reports describing any detected incidents.

The business data stored in business data warehouse 417 may include various types of information associated with one or more enterprises being monitored. In some implementations, the data may be stored in an aggregate format to allow for historical analysis of the data. An example business analytics engine 410 is SAS™ Business Analytics and Business Intelligence Software, available from SAS™ Institute Inc. of Cary, N.C. Other business analysis software can alternatively be used.

As cases are opened, data for the cases may be stored in one or both of insider threat warehouse 418 and shared insider threat warehouse 419. The stored data may be used for evaluating system 400 over time, such as, for example, to identify trending, maintain historical records, analyze false positives and negatives of the system, analysis of case histories, etc.

Once a case is generated and sent to the server sub-system 404, one or more service support team staff 414 may review the case and respond appropriately. The response may include contacting a client security operations center (SOC) 415 and providing an alert of the incident. Client SOC 415 may then request that a client investigation team 416 do further review. Alternatively and/or additionally, the response may include contacting client investigation team 416 directly.

Server sub-system 404 may also include analytics team 420 to analyze feedback received from each of one or more client sub-systems 402 to determine successes and/or failures of the system and perform rules maintenance. Some of the feedback may also be provided to a shared client analytics engine 422 to analyze user feedback received from one or more of individual and/or multiple client enterprises, and determine when rules are to be updated.

Shared client analytics engine 422 may include one or more rules 432, e.g. industry-specific rules 432a, insider threat rules 432b, etc., business analytics engine 430, business data warehouse 437, and ad hoc reports engine 441. In some embodiments, shared client analytics engine 422 may use business analytics engine 430 to apply one or more rules 432 to data 406. Shared client analytics engine 422 may also use business analytics engine 430 to analyze business data stored in business data warehouse 437. Shared client analytics engine 422 may use ad hoc reports engine 441 to generate reports describing any detected incidents. In some embodiments, shared client analytics engine 422 may also generate ad hoc reports for multiple clients. For example, these ad hoc reports can list particular trends in insider fraud detections across industries. Server sub-system 404 may also include service delivery team 424 to assist client enterprises with their internal systems.

While FIG. 4 describes a distributed system, the components of an insider threat detection system could alternatively be executed by a single enterprise, without a separate server sub-system.

Figure 5:
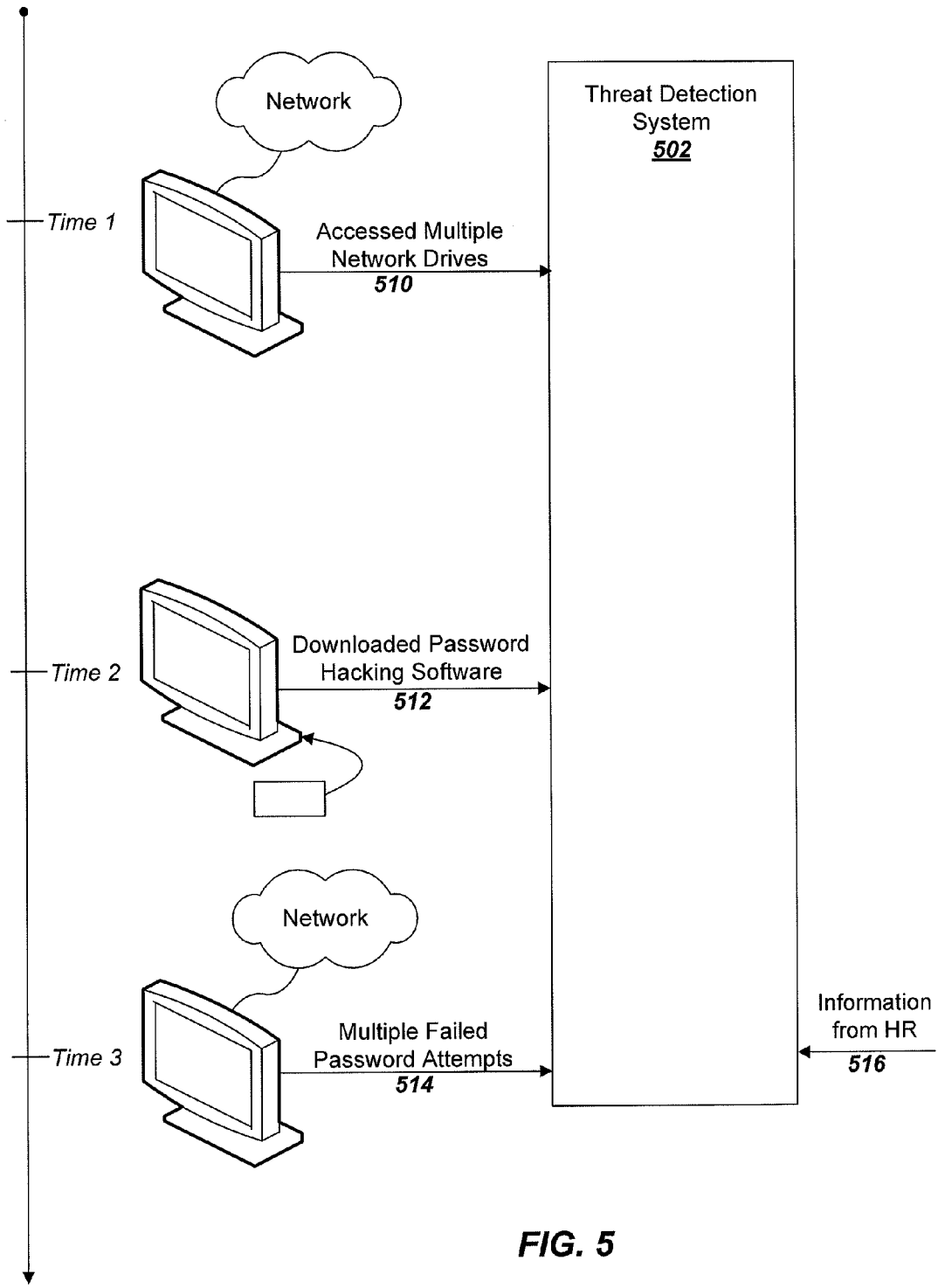
FIG. 5 illustrates an example use case of an insider threat detection system, consistent with certain disclosed embodiments.

FIG. 5 illustrates an example use case of an insider threat detection system 502, consistent with certain disclosed embodiments. Specifically, FIG. 5 illustrates an embodiment in which the actions of an enterprise insider are collected over time, and the data that is provided to the threat detection system 502.

As an exemplary scenario illustrating a use of insider threat detection system 502, an enterprise insider who is a mid-level information technology application support technician may believe that the enterprise intends to downsize the information technology team. As a result, he intends to encrypt sensitive data and commit extortion against the enterprise if laid off. To do this, he must first locate the data and then encrypt the data with a unique key that only he can use to decrypt the files at some later point (e.g., upon payment of ransom by the enterprise).

At a first time, Time 1, the enterprise insider performs network reconnaissance on network drives to look for sensitive files. As part of this, he accesses multiple shared network drives. At a second time, Time 2, the enterprise insider loads password hacking software onto his computer, and at a third time, Time 3, multiple failed attempts to access password protected drives are made from the enterprise insider's computer.

As a result of this activity by enterprise insider, threat detection system 502 receives data indicating a high volume of network shared access 510, for example, from a security information and event management (SIEM) system run by the enterprise. Threat detection system 502 also receives data indicating that password hacking software was downloaded onto the enterprise insider's computer 512, for example, from a content filtering platform. This data is correlated with the earlier data based, for example, on the user identifier, the time at which it occurred, or one or more profiles maintained by threat detection system 502. As discussed above, each profile can be a set of rules maintained by a rules engine that specify that particular actions taken within certain time periods should be grouped together for correlation purposes. The profile also specifies when different types of activity should be aggregated to create a new case. Next, threat detection system 502 receives data indicating the multiple failed password attempts 514, for example, from SIEM system run by the enterprise. In some embodiments, threat detection system 502 also receives information from human resources 516 indicating that the enterprise insider has two prior security policy violations and a recent report of misconduct. This data is combined into a case, and the case is scored. The score satisfies the threat threshold and the enterprise insider can be stopped before the data is encrypted.

Figure 6:
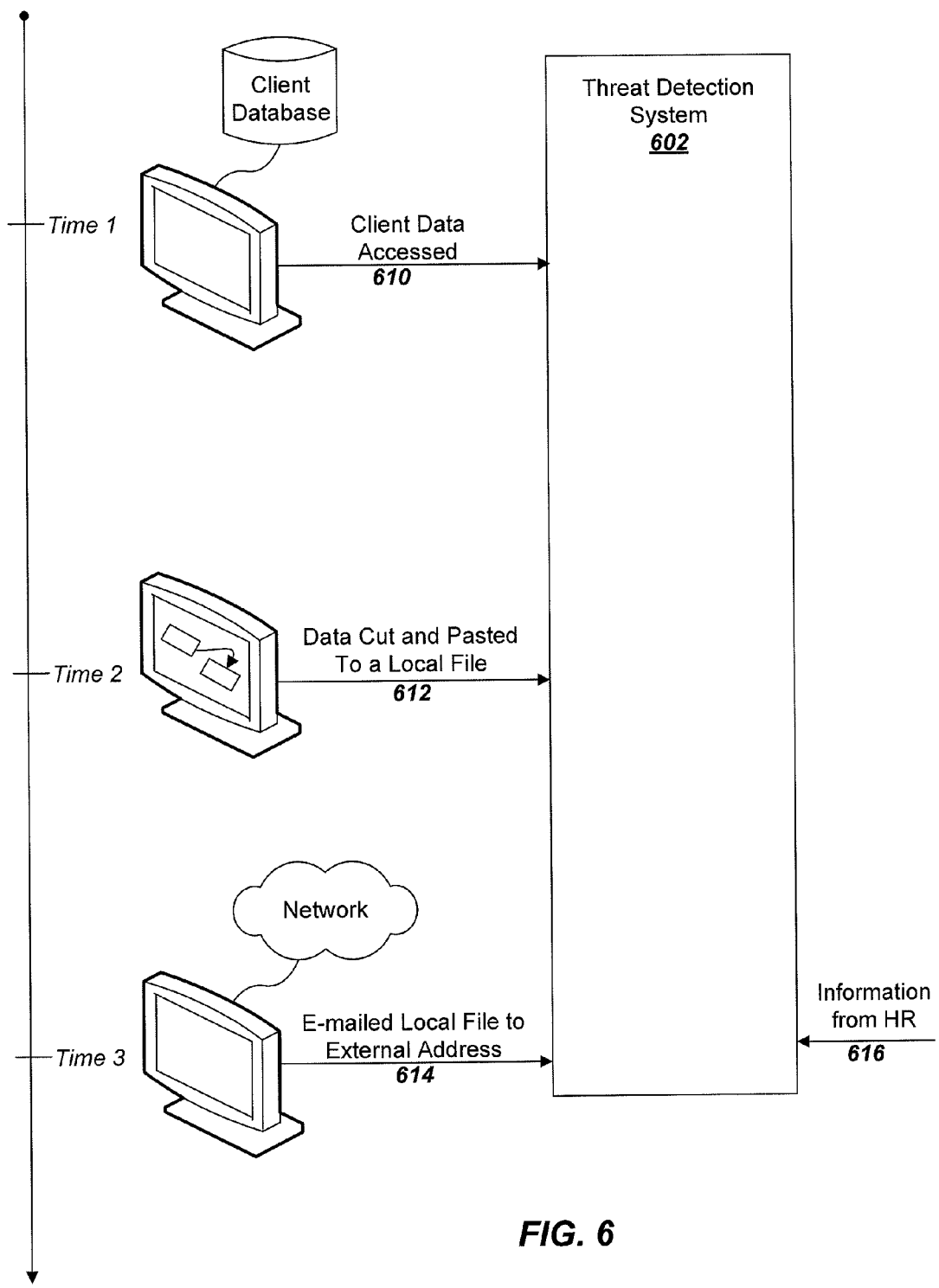
FIG. 6 illustrates another example use case of an insider threat detection system, consistent with certain disclosed embodiments.

FIG. 6 illustrates another example use case of an insider threat detection system 602, consistent with certain disclosed embodiments. In the example use case illustrated in FIG. 6, an enterprise insider who is a financial analyst is about to move to a competitor to increase his own compensation. He believes that his new employer would like to receive a list of key private wealth clients of his current employer. Therefore, he attempts to send himself a copy of the list of clients.

At a first time, Time 1, the enterprise insider accesses data in the client database. Because mass copying is not possible from the client database, the enterprise insider performs individual cut and paste operations to copy the client information from the database to a local file on his computer at a second time, Time 2. At a third time, Time 3, the enterprise insider e-mails the file to an external e-mail address owned by him.

Threat detection system 602 receives data indicating that the enterprise insider accessed the client data 610, for example, from a database monitoring tool. Threat detection system 604 also receives data indicating that the enterprise insider performed a cut and paste operation, transferring the data to a local file 612, for example, from the database monitoring tool. Threat detection system 602 also receives data indicating that an outgoing e-mail with a list of names, addresses, and account numbers was sent by the enterprise insider 614, for example, from a data loss prevention or content filtering system. This data is correlated and scored, and an analyst is alerted. The analyst calls human resources 616 and learns that the enterprise insider previously complained about his low compensation and had previously threatened to leave the enterprise if he was not promoted. This information is added to the case, and the case is re-scored. The analyst then alerts the enterprise to the threat, for example, by calling the enterprise's security department or uploading a summary of the case to a protected portal.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In general, one innovative aspect of the subject matter described in this specification can be embodied in methods that include the actions of detecting insider threats based upon applying customized threat detection rules to data that describes an insider's interactions with two or more different types of data sources. When the application of the rules to the data indicates that a threat level exceeds a certain threshold value, automated actions may be taken to monitor or limit the ability of the insider to harm an enterprise, or a customized workflow may be provided to a human caseworker (analyst) to walk the caseworker through the operations that would be necessary to determine whether the insider's interactions constitute a threat.

In general, another innovative aspect of the subject matter described in this specification can be embodied in methods that include the actions of obtaining one or more insider threat detection rules for an enterprise, the enterprise associated with a plurality of enterprise insiders; obtaining behavioral data for a first enterprise insider from a plurality of behavioral data sources, the behavioral data for the first enterprise insider describing actions of the first enterprise insider; calculating a threat score for the actions of the first enterprise insider from the behavioral data for the first enterprise insider and the one or more insider threat detection rules; determining that the threat score satisfies a threat threshold; and initiating one or more protective actions in response to the determination that the threat score satisfies the threat threshold. Other embodiments of this aspect include corresponding systems, apparatus, and computer programs recorded on computer storage devices, each configured to perform the operations of the methods.

These and other embodiments can each optionally include one or more of the following features. The threat score can represent a likelihood that the actions of the first enterprise insider represent insider fraud. The actions can further include receiving first feedback from the enterprise and updating the one or more insider threat rules in response to the first feedback. The insider threat detection rules can include one or more industry specific threat detection rules for an industry associated with enterprise, and the actions can further include receiving second feedback from a plurality of entities associated with the industry; and updating the one or more industry specific threat detection rules in response to the first feedback and the second feedback.

Initiating one or more protective actions can include opening a case corresponding to the enterprise insider actions; generating a workflow associated with the case; and alerting an analyst that the case has been opened and presenting the analyst with the generated workflow.

Initiating one or more protective actions can include initiating direct monitoring of the first enterprise insider. Initiating one or more protective actions can include limiting access of the first enterprise insider to one or more enterprise resources.

The one or more insider threat detection rules can include one or more of an industry specific rule, a general rule, and an enterprise specific rule. The plurality of behavioral data sources can include two or more of a desktop activity source, a network activity source, a server activity source, an application activity source, a web activity source, a personnel activity source, a human intelligence source, a firewall activity source, and a physical activity source. The behavioral data can further include data describing actions of a second enterprise insider, and the actions can further include identifying behavioral data corresponding to the first enterprise insider.

Particular embodiments of the subject matter described in this specification can be implemented so as to realize one or more of the following advantages. Insider threats can be identified and countered in real time. Enterprises can augment their often significant investments in existing security and fraud systems to provide new value specifically related to early identification and countering of insider threats. Enterprise security and fraud teams can be assisted by dedicated analysts. Trends, including industry-specific trends, can be identified and reported to enterprises. Enterprise policies can be enforced and employee security training gaps can be identified. Early detection of suspected internal fraud can be used to initiate a formal investigation, begin computer forensic actions, and collect evidence to support future law enforcement activities.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for detecting and investigating insider fraud, comprising:
identifying, by one or more computer processors, one or more insider threat detection rules for an enterprise organization, the enterprise organization associated with a plurality of enterprise insiders,
wherein the insider threat detection rules include one or more enterprise-specific rules generated to enforce particular enterprise policies across the enterprise organization and one or more industry-specific threat detection rules applied to a plurality of other enterprise organizations in a same industry as the enterprise organization;
obtaining, from a plurality of behavioral data sources of the enterprise organization monitoring actions of the plurality of enterprise insiders, behavioral data for the plurality of enterprise insiders and parsing the behavioral data to identify actions for a first enterprise insider of the plurality of enterprise insiders, the behavioral data for the first enterprise insider describing one or more actions of the first enterprise insider;
determining, by the one or more computer processors, a threat score representing a likelihood that the actions of the first enterprise insider represent insider fraud for the first enterprise insider based on applying the one or more insider threat detection rules to the behavioral data for the first enterprise insider;
initiating, when the threat score satisfies a first threat threshold, one or more protective actions limiting access of the first enterprise insider to the enterprise organization and generating a case for activity of the behavioral data of the first enterprise insider, wherein once the case is generated the case is periodically re-scored as additional behavioral data for the first enterprise insider is gathered and, when the threat score satisfies a second threshold, a notification is provided to the enterprise organization prompting an additional protective action;
receiving first feedback from the enterprise organization including one or more of flagged false positives, rules that were applied to generate false positives, and false negatives when insider fraud was not recognized;
updating, by the one or more computer processors, the one or more enterprise-specific rules of the insider threat detection rules in response to the received first feedback;
receiving second feedback from a plurality of other enterprise organizations associated with the same industry as the enterprise organization, wherein enterprise-specific details are removed from the second feedback and the second feedback identifies and reports industry-specific trends; and
updating the one or more industry-specific threat detection rules of the insider threat detection rules based on the first feedback and the second feedback.

2. The computer-implemented method of claim 1, wherein initiating the one or more protective actions comprises:
generating a workflow associated with the generated case; and
alerting an analyst that the case has been generated.

3. The computer-implemented method of claim 1, wherein initiating the one or more protective actions comprises:
initiating monitoring of the first enterprise insider.

4. The compute-implemented method of claim 1, wherein the plurality of behavioral data sources include two or more of a desktop activity source, a network activity source, a server activity source, an application activity source, a web activity source, a personnel activity source, a human intelligence source, a firewall activity source, or a physical activity source.

5. The computer-implemented method of claim 1, wherein the behavioral data further includes data describing an action of a second enterprise insider, the method further comprising:
identifying behavioral data corresponding to the second enterprise insider.

6. A system for detecting and investigating insider fraud, comprising:
at least one memory to store data and instructions; and
at least one processor configured to access the at least one memory and, when executing the instructions, to:
identify one or more insider threat detection rules for an enterprise organization, the enterprise organization associated with a plurality of enterprise insiders,
wherein the insider threat detection rules include one or more enterprise-specific rules generated to enforce particular enterprise policies across the enterprise organization and one or more industry-specific threat detection rules applied to a plurality of other enterprise organizations in a same industry as the enterprise organization;
obtain, from a plurality of behavioral data sources of the enterprise organization monitoring actions of the plurality of enterprise insiders, behavioral data for the plurality of enterprise insiders and parsing the behavioral data to identify actions for a first enterprise insider, the behavioral data for the first enterprise insider describing one or more actions of the first enterprise insider;

determine a threat score representing a likelihood that the actions of the first enterprise insider represent insider fraud for the first enterprise insider based on applying the one or more insider threat detection rules to the behavioral data for the first enterprise insider;

initiate, when the threat score satisfies a first threat threshold, one or more protective actions limiting access of the first enterprise insider to the enterprise organization and generating a case for activity of the behavioral data of the first enterprise insider, wherein once the case is generated the case is periodically re-scored as additional behavior data for the first enterprise insider is gathered and, when the threat score satisfies a second threat threshold, a notification is provided to the enterprise organization prompting an additional protective action;

receive first feedback from the enterprise organization including one or more flagged false positives, rules that were applied to generate false positives, and false negatives when insider fraud was not recognized;

update the one or more enterprise-specific rules of the insider threat detection rules in response to the received first feedback;

receive second feedback from a plurality of other enterprise organizations associated with the same industry as the enterprise organization, wherein enterprise-specific details are removed from the second feedback and the second feedback identifies and reports industry-specific trends; and update the one or more industry-specific threat detection rules of the insider threat detection rules based on the first feedback and the second feedback.

7. The system of claim 6, wherein when the at least one processor is configured to initiate the one or more protective actions, the at least one processor is further configured to:
generate a workflow associated with the generated case; and
alert an analyst that the case has been generated.

8. The system of claim 6, wherein when the at least one processor is configured to initiate the one or more protective actions, the at least one processor is further configured to:
initiate monitoring of the first enterprise insider.

9. The system of claim 6, wherein the plurality of behavioral data sources include two or more of a desktop activity source, a network activity source, a server activity source, an application activity source, a web activity source, a personnel activity source, a human intelligence source, a firewall activity source, or a physical activity source.

10. The system of claim 6, wherein the behavioral data further includes data describing an action of a second enterprise insider, and wherein the at least one processor is further configured to:
identify behavioral data corresponding to the second enterprise insider.

11. A non-transitory computer storage medium encoded with a computer program, the computer program comprising instructions operable to cause a data processing apparatus to perform operations for detecting and investigating insider fraud, comprising:
identifying one or more insider threat detection rules for an enterprise organization, the enterprise organization associated with a plurality of enterprise insiders, wherein the insider threat detection rules include one or more enterprise-specific rules generated to enforce particular enterprise policies across the enterprise organization and one or more industry-specific threat detection rules applied to a plurality of other enterprise organization in a same industry as the enterprise organization;

obtaining, from a plurality of behavioral data sources of the enterprise organization monitoring actions of the plurality of enterprise insiders, behavioral data for the plurality of enterprise insiders and parsing the behavioral data to identify actions for a first enterprise insider of the plurality of enterprise insiders, the behavioral data for the first enterprise insider describing one or more actions of the first enterprise insider;

determining a threat score representing a likelihood that the actions of the first enterprise insider represent insider fraud for the first enterprise insider based on applying the one or more insider threat detection rules to the behavioral data for the first enterprise insider;

initiating, when the threat score satisfies a first threat threshold, one or more protective actions limiting access of the first enterprise insider to the enterprise organization and generating a case for activity of the behavioral data of the first enterprise insider, wherein once the case is generated the case is periodically re-scored as additional behavioral data for the first enterprise insider is gathered and, when the threat score satisfies a second threat threshold, a notification is provided to the enterprise organization prompting an additional protective action;

receiving first feedback from the enterprise organization including one or more of flagged false positives, rules that were applied to generate false positives, and false negatives when insider fraud was not recognized;

updating the one or more enterprise-specific rules of the insider threat detection rules in response to the received first feedback;

receiving second feedback from a plurality of other enterprise organizations associated with the same industry as the enterprise organization, wherein enterprise-specific details are removed from the second feedback and the second feedback identifies and reports industry-specific trends; and updating the one or more industry-specific threat detection rules of the insider threat detection rules based on the first feedback and the second feedback.

12. The non-transitory computer storage medium of claim 11, wherein initiating the one or more protective actions comprises:
generating a workflow associated with the generated case; and
alerting an analyst that the case has been generated.

13. The non-transitory computer storage medium of claim 11, wherein initiating the one or more protective actions comprises:
initiating monitoring of the first enterprise insider.

14. The non-transitory computer storage medium of claim 11, wherein the plurality of behavioral data sources include two or more of a desktop activity source, a network activity source, a server activity source, an application activity source, a web activity source, a personnel activity source, a human intelligence source, a firewall activity source, or a physical activity source.

15. The non-transitory computer storage medium of claim 11, wherein the behavioral data further includes data describing an action of a second enterprise insider, and wherein the instructions are further operable to cause the data processing apparatus to perform operations comprising:
   identifying behavioral data corresponding to the second enterprise insider.

\* \* \* \* \*

UNITED STATES PATENT AND TRADEMARK OFFICE
CERTIFICATE OF CORRECTION

PATENT NO. : 8,868,728 B2  
APPLICATION NO. : 12/950251  
DATED : October 21, 2014  
INVENTOR(S) : Jeffrey M. Margolies et al.

Page 1 of 1

It is certified that error appears in the above-identified patent and that said Letters Patent is hereby corrected as shown below:

In the Claims

Claim 4, Col. 38, Line 15, "compute-implemented" should read as --computer-implemented--.

Signed and Sealed this
Seventeenth Day of February, 2015

Michelle K. Lee
*Deputy Director of the United States Patent and Trademark Office*